R. O. NAVARRETE.
MOTOR CYCLE SUPPORT.
APPLICATION FILED JUNE 30, 1914.
1,168,955.
Patented Jan. 18, 1916.
2 SHEETS—SHEET 1.
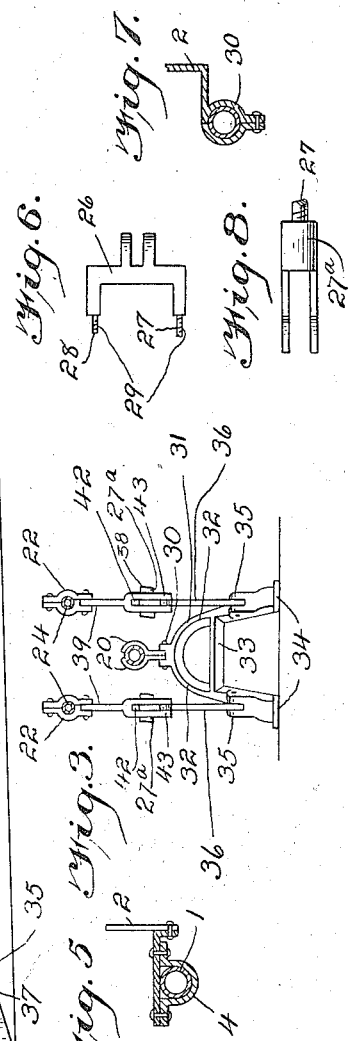
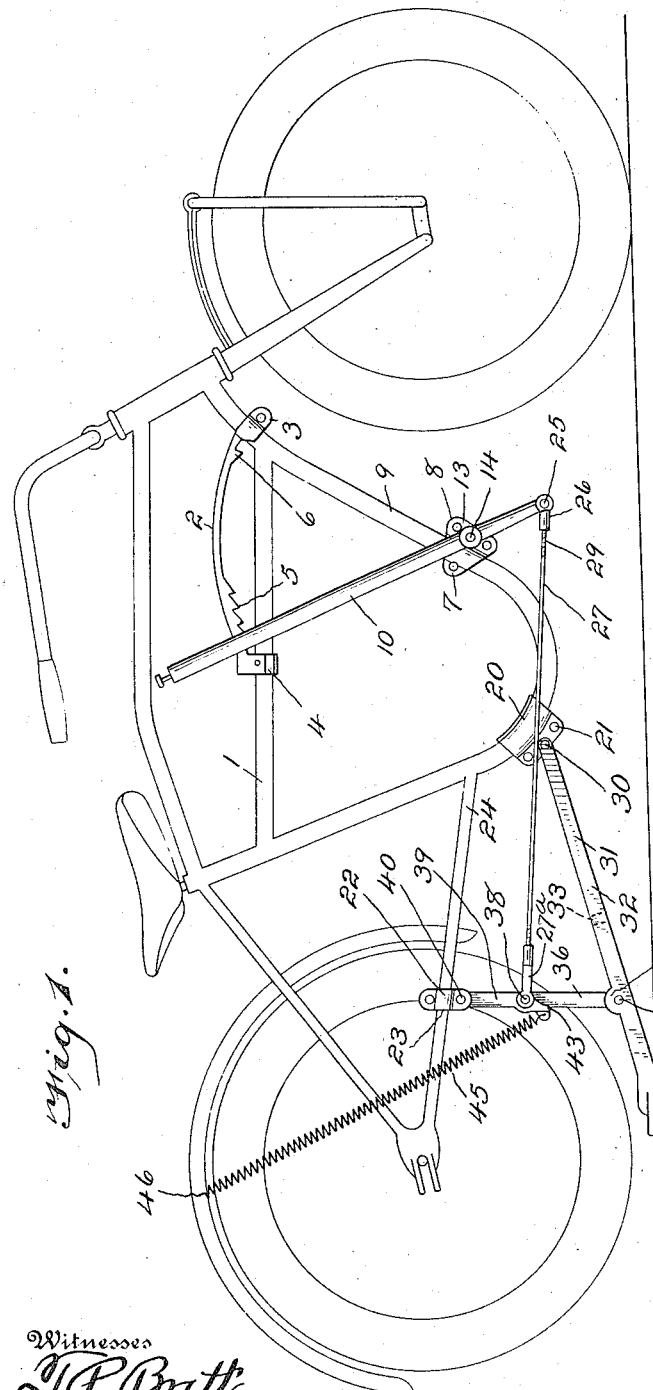
Witnesses
J. P. Britt
Francis G. Boswell
Inventor
R. O. Navarrete
By D. Swift &C.
Attorneys

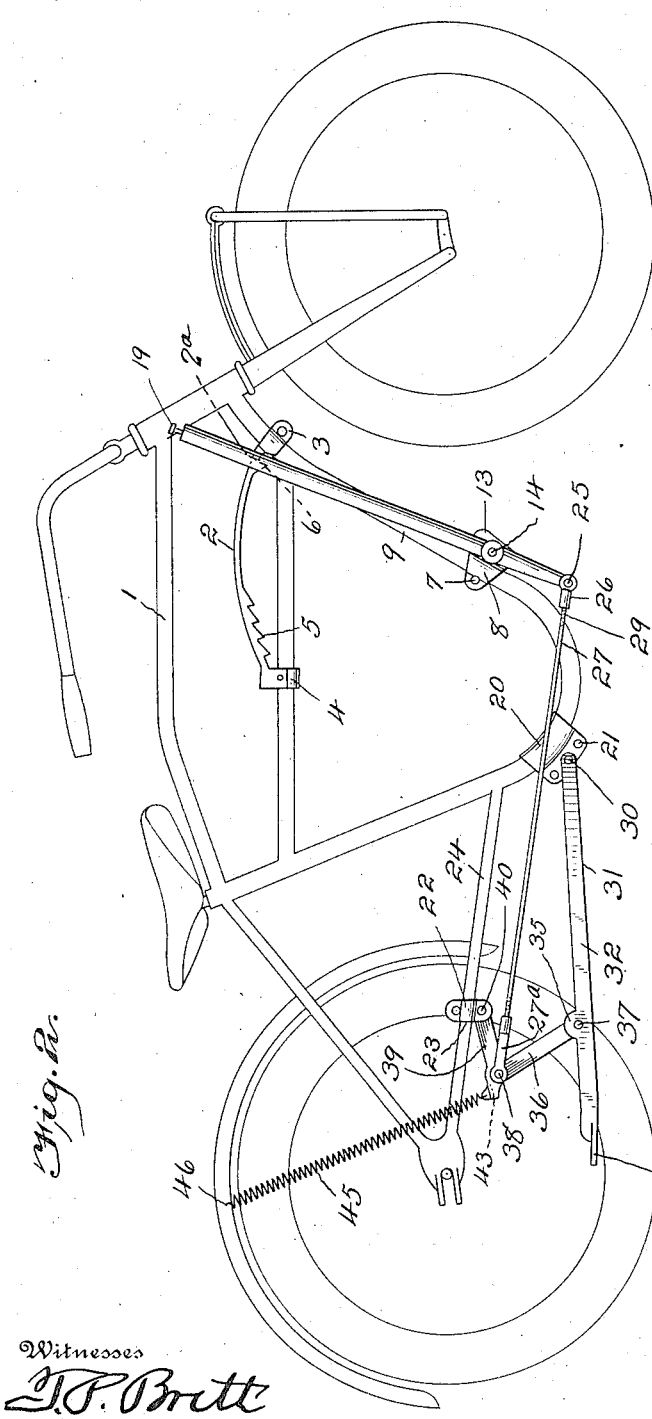

UNITED STATES PATENT OFFICE.

RAMÓN ORIOL NAVARRETE, OF MANILA, PHILIPPINE ISLANDS.

MOTOR-CYCLE SUPPORT.

1,168,955.  Specification of Letters Patent.  Patented Jan. 18, 1916.

Application filed June 30, 1914.  Serial No. 848,288.

*To all whom it may concern:*

Be it known that I, RAMÓN ORIOL NAVARRETE, a citizen of the United States, residing at Manila, in the Philippine Islands, have invented a new and useful Motor-Cycle Support; and I do hereby declare the following to be a full, clear, and exact description of the invention, such as will enable others skilled in the art to which it appertains to make and use the same.

This invention relates to the art of two wheel motor vehicles, such as motorcycles, bicycles and the like, and it is the aim to provide an improved support, which may be thrown into supporting position prior to dismounting or subsequently thereof.

Another object of the invention is to provide a support of this nature, including means so constructed and operated, that the rear wheel of the vehicle may be jacked up, either before dismounting or subsequently, the operating means of the support being arranged somewhat adjacent the handle bars of the vehicle, in close position so as to be grasped by the rider.

Another object of the invention is the provision of a support, which may be applied to any form of motorcycle or the like, and which is more efficient, practical and desirable in construction.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation of a conventional form of motorcycle, showing the improved supporting jack as applied thereto, illustrating the rear wheel jacked up. Fig. 2 is a similar view showing the rear wheel lowered. Fig. 3 is a detail view of the supporting feet and legs of the support, showing the toggle link connections to the frame of the cycle. Fig. 4 is a detail view of the operating lever, showing parts in section. Figs. 5, 6 and 7 are detail views of different parts of the supporting device. Fig. 8 is a detail view of the member 27ª.

Referring to the drawings 1 designates the frame of a conventional form of motorcycle, and secured to this frame is a segmental curved bar 2, by means of the clamps 3 and 4. This bar 2 at one end is provided with several ratchet teeth 5, and at the other end with a single tooth 6. Secured at 7 is a pair of clamps 8. These clamps 8 are carried by the drop portion 9 of the frame of the cycle. An operating lever 10 is provided having an offset arm 11, spaced apart from the body of the operating lever, as shown, to provide a crotch 12. The clamping plates 8 are constructed with extensions 13, which fit the crotch 12, there being a pivot bolt 14 passing through the body portion of the operating lever, and through the extensions 13 and the arm 11, thereby pivotally mounting the lever. The upper end of the lever is provided with a hollow portion 15, in which a dog 16 in the form of a rod is arranged. The lever 10 at its upper end portion is provided with a slot 2ª, through which the segmental curved bar extends, and which slot is formed a little to one side of the center of the hollow part of said lever 10, so that the bar 2 will not interfere with the shank 15ª of the dog 16. This dog 16 operates below the bar 2, and is provided with a nose 18, and by virtue of the spring 17 (which is interposed between the lower end of the dog and the lower end of the hollow portions of said lever) this nose 18 is held in engagement with any one of the teeth 5 of the bar 2, or in engagement with the tooth 6. When the nose of the dog is in engagement with one of the teeth 5 the supporting frame for the motorcycle is lowered. When the nose 18 is in engagement with the tooth 6, the supporting frame for the motorcycle is raised, as shown in Fig. 2. A thumb piece 19 is provided at the upper terminal end of the shank 15ª of the dog, and by pressing thereon, the nose is disengaged from the teeth, against the action of the spring. Also carried by the drop portion 9 of the frame is a pair of clamps 20, of a shape to fit the cylindrical portion of the tubular rod of the drop portion. The clamps 20 are secured together as at 21.

A pair of clamps 22 is clamped as at 23 to each of the rearwardly extending bars 24 of the frame of the cycle.

Pivoted at 25 to the lower end of the operating lever 10 is a yoke 26, into the forks of which the rods 27 and 28 are threaded, as shown at 29, and the purpose of these rods will presently appear.

Pivoted at 30 to the clamps 20 is a frame 31. This frame comprises the legs 32 braced relative to each other by the bar 33, and terminating at their rear portions in supporting feet 34, the under surfaces of which are broad and flat, and are designed to engage the surface under the motorcycle, when the frame 31 is lowered, in order to firmly support the vehicle.

Intermediate the feet and said legs are ears 35, between which the links 36 are pivoted at 37. The links 36 are in turn pivoted at 38 to the toggle links 39, which in turn are pivoted at 40 to the clamps 22. The rear ends of the rods 27 and 28 are threaded to the members 27ª, which in turn are also pivoted at 38. The lower end of the toggle links 39 are constructed with pockets 42, to receive the upper ends of the links 36, there being shoulders 43, to prevent the toggle links 36 and 39 from collapsing at their pivotal connections in a forward direction. However, the pockets are so constructed that the toggle links may easily collapse at their pivotal joints in a rearward direction, to allow the motorcycle frame to lower. In preventing the links from collapsing at their pivotal joints in the forward direction, the motorcycle frame is held raised or jacked up.

At the lower ends of the toggle links 39, adjacent the pockets, the lower ends of springs 45 are connected, the upper ends of said springs being connected to opposite sides of the wheel guard, as shown at 46. When the toggle links are collapsed at their pivotal joints in a rearward direction, these springs serve to hold the frame 31 in a raised position, and therefore in this case the rear wheel of the motorcycle will be resting or engaging upon the surface traversed by the vehicle.

When the operating lever is disposed, so that the nose of the dog engages the tooth 6, the frame 31 is raised and the rear wheel of the cycle is lowered. When the nose of the dog of the operating lever is engaging any one of the teeth 5 and the lever is arranged so that this may be accomplished, then the frame 31 is lowered, and the toggle links are alined, so as to hold the rear wheel of the motorcycle jacked up, as illustrated in Fig. 1.

The invention having been set forth, what is claimed as new and useful is:—

In combination with a motor-cycle frame, a supporting frame therefor U-shaped in plan view and having a pivotal connection with the depending part of the motor-cycle frame, the legs of said U-shaped supporting frame extending rearwardly, one upon each side of the rear wheel of the motor-cycle and terminating in a foot, a pair of toggle-links on each side of the rear wheel of the motor-cycle, designed to collapse rearwardly and being pivotally suspended from the rear lower part of the motor-cycle frame, the lower link of each pair being pivotally connected to one of the legs of the U-shaped supporting frame, one of the links of each pair having a shoulder adjacent its pivotal connection to the coöperating link, to stop the toggle-links when thrown forwardly and in alinement, a rod connected to and extending from the pivotal connections of each pair of toggle-links, a yoke connecting the adjacent forward ends of both of said rods, a lever pivoted on the motor-cycle frame and having its lower end connected to said yoke to operate the toggle-links to raise and lower said U-shaped supporting frame, means for holding the lever in adjusted positions, said shoulders of the toggle-links acting to reinforce and hold the links in alinement and the feet of the U-shaped frame in contact with the ground, and springs connected to the frame of the cycle and in turn to the links to assist in collapsing them to raise the U-shaped frame.

In testimony whereof I have signed my name to this specification in the presence of two subscribing witnesses.

RAMÓN ORIOL NAVARRETE.

Witnesses:
   AYOMO ORIOL,
   MARIANO DE MURDO.